US008539859B2

(12) United States Patent
O'Reilly

(10) Patent No.: US 8,539,859 B2
(45) Date of Patent: Sep. 24, 2013

(54) BICYCLE HANDLEBAR WITH PALM SUPPORT

(76) Inventor: James W. O'Reilly, Tallahassee, FL (US)

(*) Notice: Subject to any disclaimer, the term of this patent is extended or adjusted under 35 U.S.C. 154(b) by 54 days.

(21) Appl. No.: 12/979,576

(22) Filed: Dec. 28, 2010

(65) Prior Publication Data

US 2011/0126664 A1 Jun. 2, 2011

Related U.S. Application Data

(63) Continuation-in-part of application No. 11/650,090, filed on Jan. 5, 2007, now abandoned.

(51) Int. Cl.
*B62K 21/26* (2006.01)
(52) U.S. Cl.
USPC .......................................... 74/551.9
(58) Field of Classification Search
USPC ............ 74/488, 551.1, 551.8, 551.9; 16/421; 403/83
See application file for complete search history.

(56) References Cited

U.S. PATENT DOCUMENTS

| | | | | |
|---|---|---|---|---|
| 4,522,083 A * | 6/1985 | Morgan | ........................ | 74/551.9 |
| 4,873,886 A * | 10/1989 | Renner | ........................ | 74/551.8 |
| 5,235,871 A * | 8/1993 | Yamazaki et al. | ............ | 74/551.8 |
| 5,265,496 A * | 11/1993 | Townsend | ..................... | 74/551.8 |
| 2008/0163719 A1* | 7/2008 | O'Reilly | ........................ | 74/551.8 |

* cited by examiner

*Primary Examiner* — Vicky Johnson
(74) *Attorney, Agent, or Firm* — J. Wiley Horton

(57) ABSTRACT

An integrated drop style handlebar including a left and right palm support. Each palm support is attached to the forward portion of the handlebar frame adjacent to a hood. Each palm support extends laterally outward away from the handlebar's middle portion. An upward facing surface on each palm support is positioned to support a distal lateral portion (the portion of the palm distal to the thumb and proximal to the fifth metacarpal bone) of a rider's palm while the web of the hand is placed on a hood. Each palm support preferably also provides a large enough surface to support substantially all of a rider's palm when the web is not placed on a hood.

16 Claims, 17 Drawing Sheets

BICYCLE HANDLEBAR WITH PALM SUPPORT

CROSS-REFERENCES TO RELATED APPLICATIONS

This application is a continuation in part of U.S. application Ser. No. 11/650,090. The prior application was filed on Jan. 5, 2007 now abandoned and listed the same inventor.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of bicycles. More specifically, the invention comprises an integrated handlebar assembly including a palm support located adjacent to each of the two brake/shift lever assemblies.

2. Description of the Related Art

Most touring and racing bicycles utilize "drop" style handlebars. An example of a drop style handlebar is illustrated in FIG. 1. The frame of handlebar 1 principally comprises a single piece of tubing (typically made of aluminum or carbon composite) formed as shown. Handlebar 1 has a straight middle portion 31 that is horizontal with respect to the ground. Middle portion 31 is approximately as wide as the rider's shoulders. Handlebar 1 is attached to the bicycle at the center of middle portion 31 by a clamping device referred to as a "stem." A horizontal bend 30 lies on each end of middle portion 31. Horizontal bend 30 is an approximately 90 degree bend that connects middle portion 31 to the two forward portions 32. Forward portion 32 may actually be angled downward in some versions so the phrase "horizontal bend" does not mean that the bend is perfectly horizontal.

Each forward portion 32 is connected to a drop 3 by a vertical bend 34. The vertical bends and attached drops create a crescent moon shape with concavity facing rearwards (toward the rider). The use of the word "bend" in this descriptive language is not intended to imply that the structure illustrated is actually created by bending. Although some handlebar assemblies are created by bending straight tubing, other versions are created by forming a composite structure in the final shape (as well as other known techniques).

The configuration of handlebar 1 is intended to allow the rider to use multiple hand positions when riding the bike. The use of different hand positions helps alleviate fatigue and blistering during long rides.

Handlebar 1 also provides a location for mounting additional hardware used to control the bicycle. Brake controls and gear shifting controls are almost always included in the handlebar assembly. These two controls may be consolidated into a single integrated unit. FIG. 1 illustrates a typical version of a consolidated brake/shifting control. Brake/shift lever assembly 2 is typically attached to handlebar 1 proximate the most forward point of forward portion 32 at the point where the tubing joins vertical bend 34 (The mounting may even extend into the vertical bend for some versions).

Drop-style handlebars were originally used in two hand positions. In the first position, the rider would place his or her hands on the laterally extending regions of middle portion 31. In the second position, the hands would be placed on the two drops 3. Brake controls were located in the position shown for brake/shift lever assembly 2 in FIG. 1 (The shift controls at that time remained on the frame of the bicycle itself). Once this evolution occurred, some riders began using the brake controls as part of a third hand position in which the rider would place the web of each hand (the flesh between the thumb and forefinger) around the upper portion of the brake control and use it for support.

The brake and shift controls were ultimately integrated as shown in the version of FIG. 1. As it became more common for riders to use the brake/shift control as a band support, the shape of these controls evolved to accommodate this desire. In the version of FIG. 1, each brake/shift lever assembly 2 is covered by a contoured and preferably pliable cover known as a "hood." Hood 22 preferably surrounds the rearward facing surfaces of the brake/shift lever assembly and provides a comfortable resting place for the web of each hand. A rider using this position is said to be "on the hoods." The "on the hoods" position is generally used when riding the bicycle over flat terrain and when climbing hills. A brake/shift lever 23 extends away from each hood 22 and these are used to actuate the brake or shift gears in a manner which is well known to those familiar with the art.

When riding on the hoods, the rider rests the web of each hand primarily on the rearward facing portion of a hood. The rider then wraps the thumb around the inside portion of the hood and the fingers around the outside portion of the hood. The inside carpus area of the wrist is then supported by the handlebar tubing. The outer portions of the palm (portions of the palm distal to the thumb, including the metacarpus area of the fingers and the outer portion of the wrist; referred to as the "distal lateral palm") are left unsupported and drape off the outer sides of the hood. Thus, the thumb acts as a hook which keeps the hands from sliding off the hoods. Grip is maintained by squeezing the thumb and fingers together.

Many riders experience a substantial amount of pain and discomfort when riding "on the hoods." Substantial pressure is applied to the inside area of the hand contacting the hoods while riding, since this area of the hand supports the forward and downward leaning weight of the rider's upper torso. This asymmetric, pressure on the inside of the palm and the lack of support on the distal lateral palm causes the hand to rotate off the sides of the hood. The rider counteracts this rotation by constantly squeezing and gripping the hood with the thumb and fingers.

Additional pressure is also applied to the inside palm area during braking when the forward momentum of the rider is transmitted to the handlebars. This pressure on the inside palm area compresses nerves which control hand muscles and convey sensory data from the hand. Prolonged compression of these nerves results in hand numbness, pain, weakness in grip, and a loss of hand function. This loss of hand function reduces the rider's ability to steer, brake, and shift the bicycle.

Although several inventors have developed different types of ergonomic handles and padding designed to make gripping a handlebar more comfortable, these devices do not provide the needed outside support for the hand while riding on the hoods. It is therefore desirable to provide a palm support which addresses these shortcomings of the prior art while being adapted for use with existing handlebar designs.

BRIEF SUMMARY OF THE INVENTION

The present invention is an integrated drop style handlebar including a left and right palm support. Each palm support is attached to the forward portion of the handlebar frame adjacent to a hood. Each palm support extends laterally outward away from the handlebar's middle portion. An upward facing surface on each palm support is positioned to support a distal lateral portion (the portion of the palm distal to the thumb and proximal to the fifth metacarpal bone) of a rider's palm while the web of the hand is placed on a hood. Each palm support preferably also provides a large enough surface to support substantially all of a rider's palm when the web is not placed on a hood.

The palm support reduces the pressure on the interior portion of the rider's palm when riding on the hoods. The palm support also counteracts the asymmetric pressure on the inside of the palm which has the tendency to cause the hands to rotate off the hood. Accordingly, the palm support provides a more comfortable gripping position and reduces the numbness and pain riders experience while riding on the hoods. The palm support also provides a new gripping position that may be utilized when steering the bicycle.

DETAILED DESCRIPTION OF THE INVENTION

Figure 1:
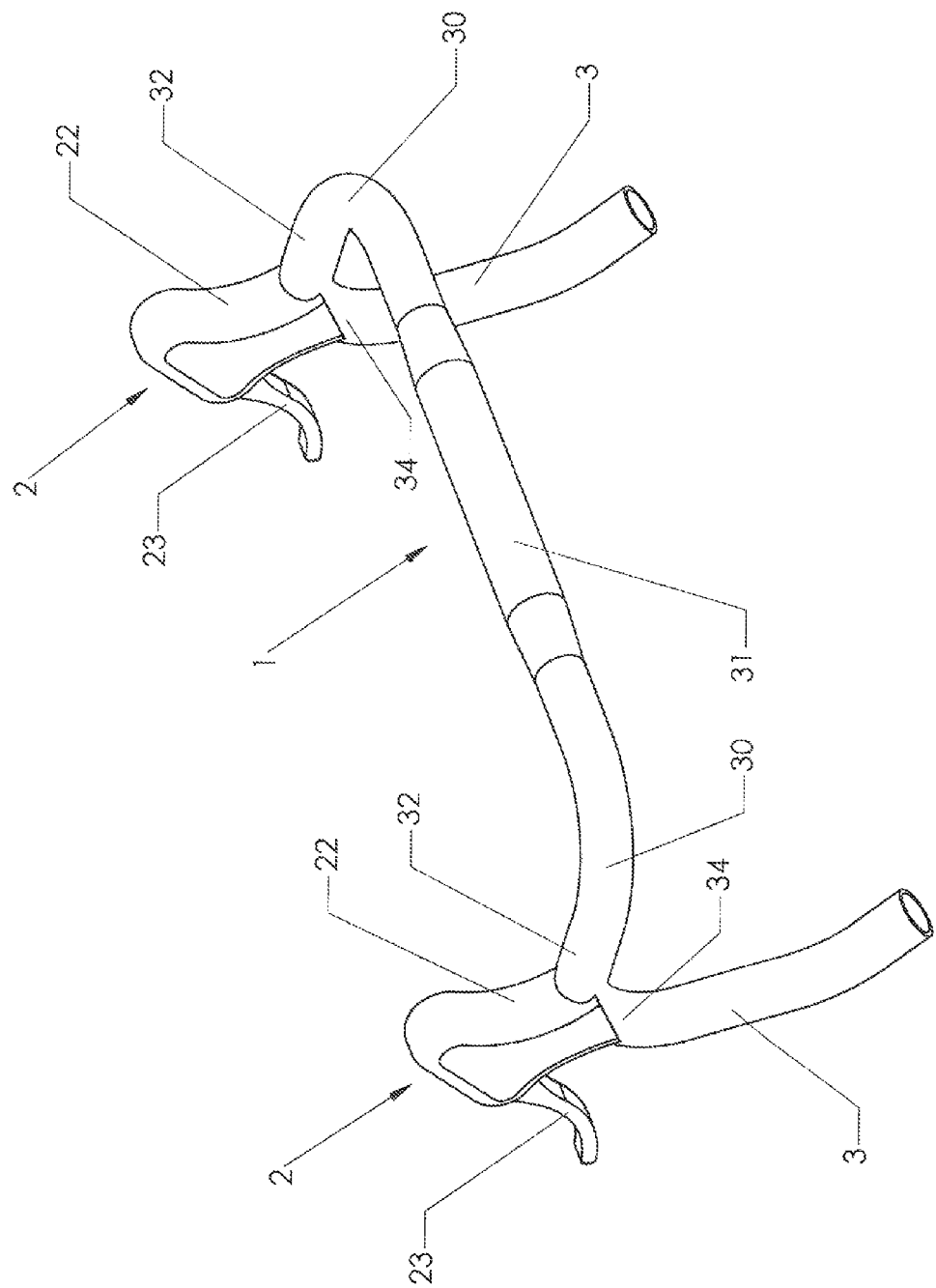
FIG. 1 is a perspective view, showing a prior art drop style handlebar.
Figure 2:
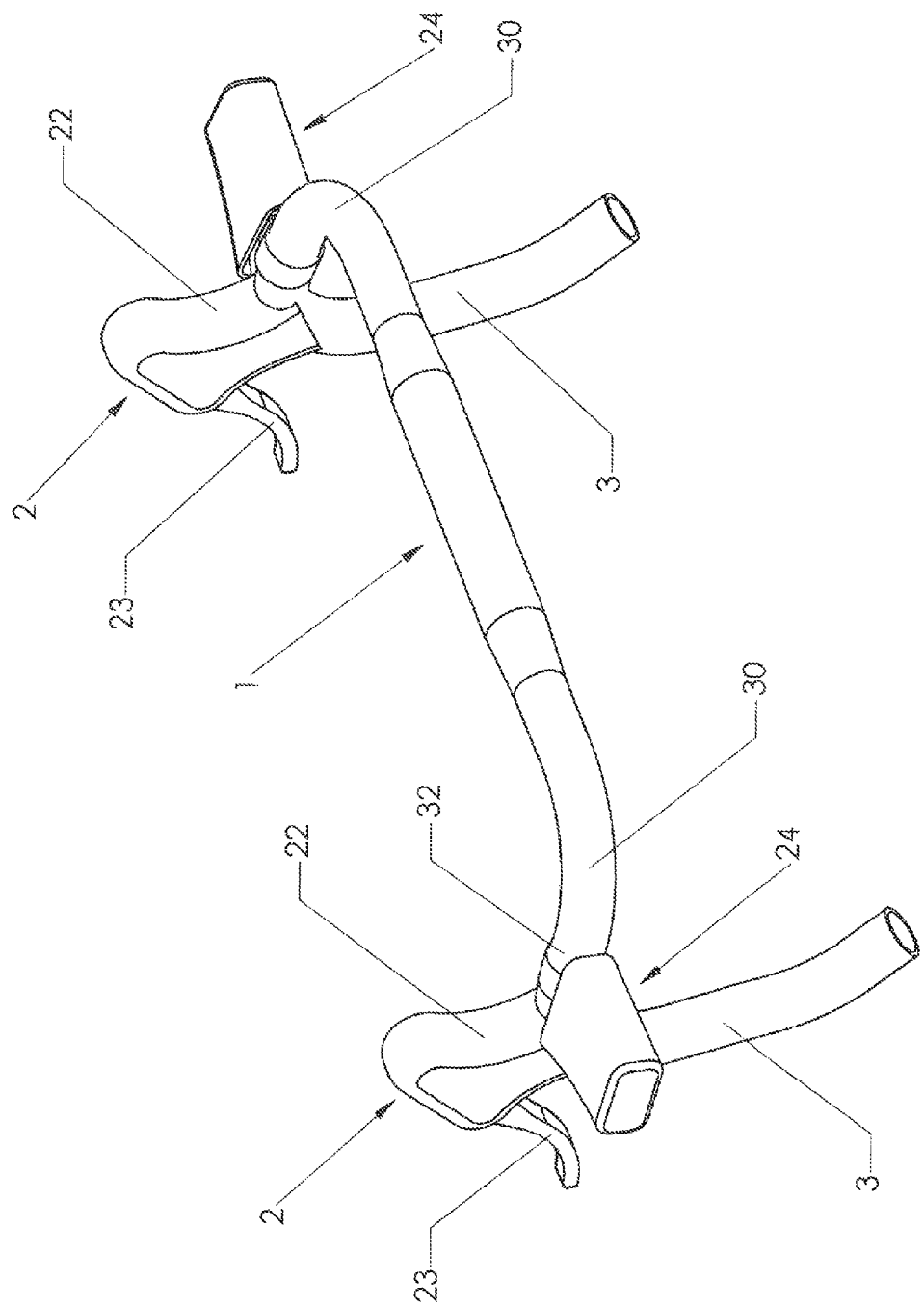
FIG. 2 is a perspective view, showing a drop style handlebar according to the present invention.

As illustrated in FIG. 2, the integrated handlebar assembly made according to the present invention includes a pair of palm supports 24. Each palm support 24 is attached to the frame of handlebar 1 between a horizontal bend 30 and a hood 22. A palm support must be placed proximate a hood in order to provide the desired functionality. When placed in this location, palm supports 24 provide support to the outer portion of the rider's palms (the portion of the palm distal to the thumb and proximal to the fifth metacarpal bone, hereinafter referred to as the "distal lateral palm"). This added support is particularly useful when the rider is riding "on the hoods."

Figure 3:
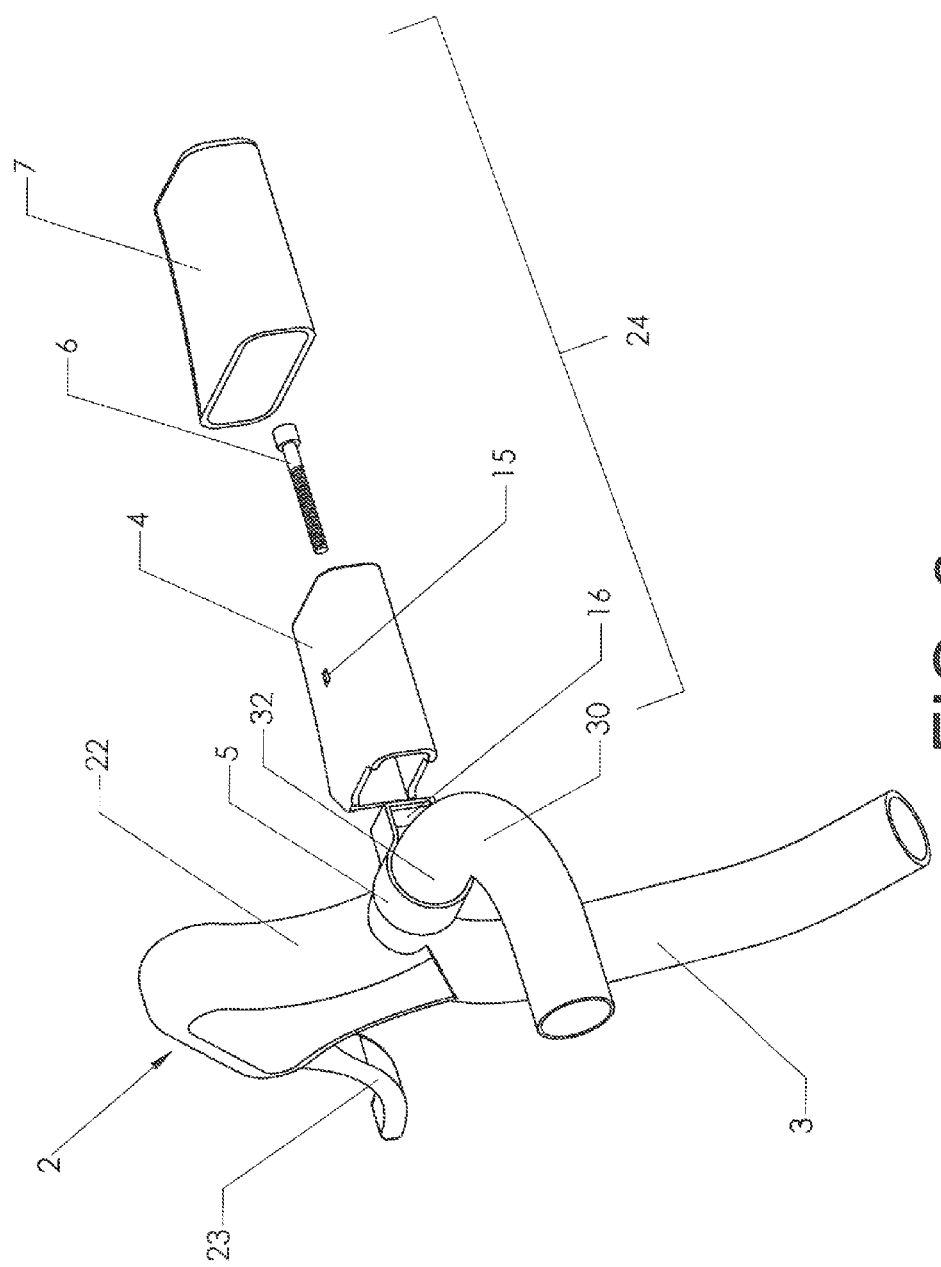
FIG. 3 is an exploded view, showing a palm support.

The palm supports may be attached to the rest of the handlebar assembly by a variety of techniques and may in fact be integral to the handlebar assembly. FIG. 3 shows one embodiment in which the palm support is made as a separate piece and attached to the handlebar.

The palm support includes a band clamp, a support member, a bolt, and a cover. The band clamp includes band 5 which is adapted to wrap around the handlebar and bolt receiver 16 which has female threading. A first end of support member 4 mates with the forward portion 32 of the handlebar. The opposite end extends outwardly away from forward portion 32. Bolt 6 has a threaded shank which extends axially through a bore in support member 4 and engages the female threading of bolt receiver 16. When bolt 6 engages the female threading and is tightened, forward portion 32 is clamped between band 5 and support member 4. Support member 4 is thereby rigidly locked to forward portion 32.

Cover 7 preferably covers substantially all the exposed surfaces of support member 4. It is preferably made of a pliable material—such as rubber or soft plastic—in order to facilitate the rider's comfort and grip. Cover 7 may be held in place via friction or via other features such as a mechanical interlock.

Figure 4:
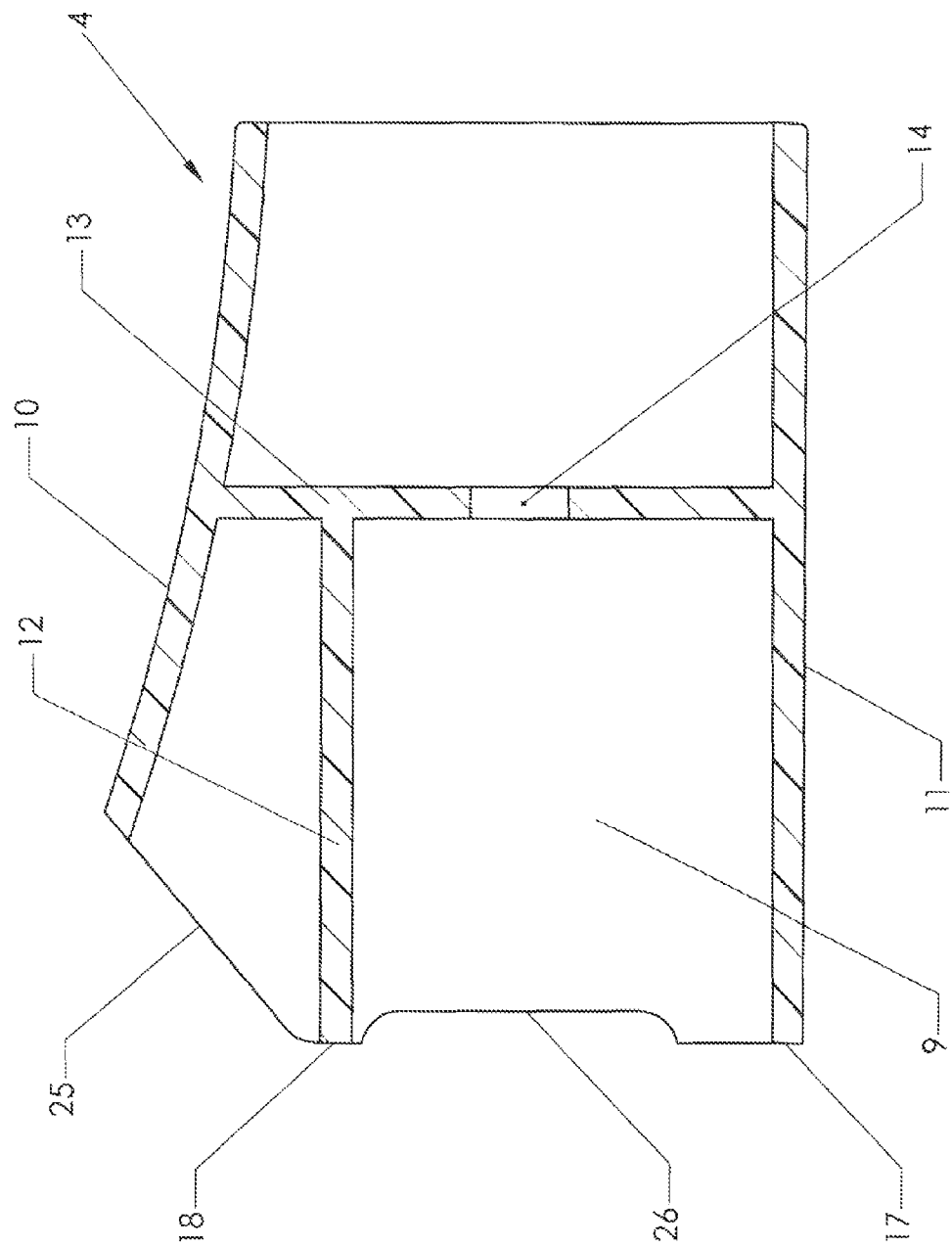
FIG. 4 is a section view, showing a support member.
Figure 5:
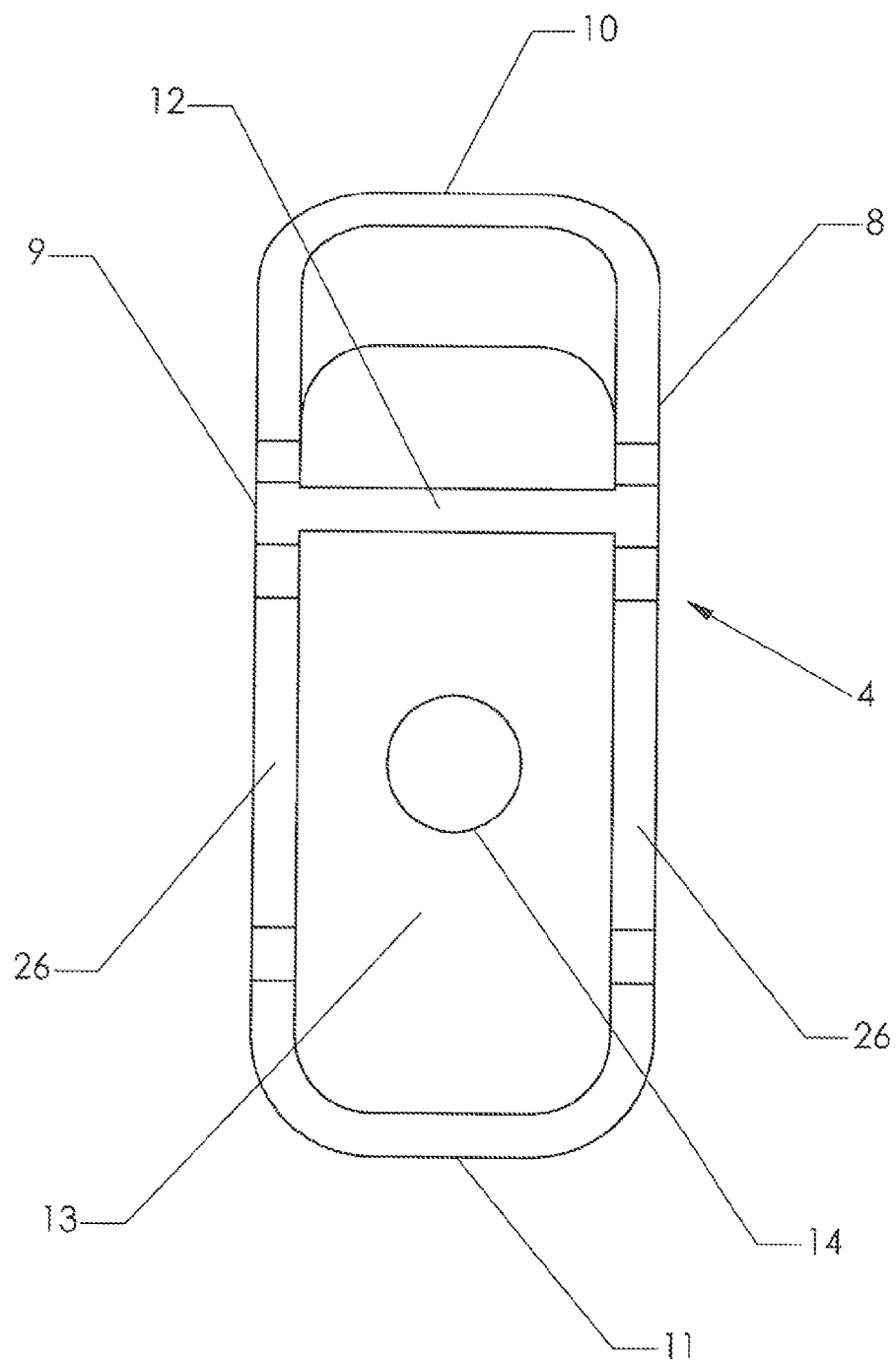
FIG. 5 is an end view, showing a support member.

Support member 4 is illustrated in greater detail in FIGS. 4 and 5. FIG. 4 is a sectioned plan view of support member 4. In the preferred embodiment, support member 4 has rearward wall 11, forward wall 10, and bottom wall 9. FIG. 5 shows an end view of support member 4. Top wall 8 is visible in this view. Returning to FIG. 4, transverse wall 13 extends across the interior of support member 4 between rearward wall 11, forward wall 10, top wall 8, and bottom wall 9. Middle wall 12 extends from transverse wall 13 toward the end of support member 4 that mates with the handlebar. Bore 14 passes axially through transverse wall 13 and receives the shank of bolt 6.

Reliefs 26 are provided in top wall 8 and bottom wall 9 and receive band 5 when the support member and hand clamp are attached to forward portion 32 of the handlebar. When clamped to the forward portion, contact points 17 and 18 bear against the forward portion. Relief 25 is provided along forward wall 10 to allow for overlap with a portion of hood 22. This relief allows the support member and the hood to be placed more closely together and provides a smoother intersection between the two components.

Figure 6:
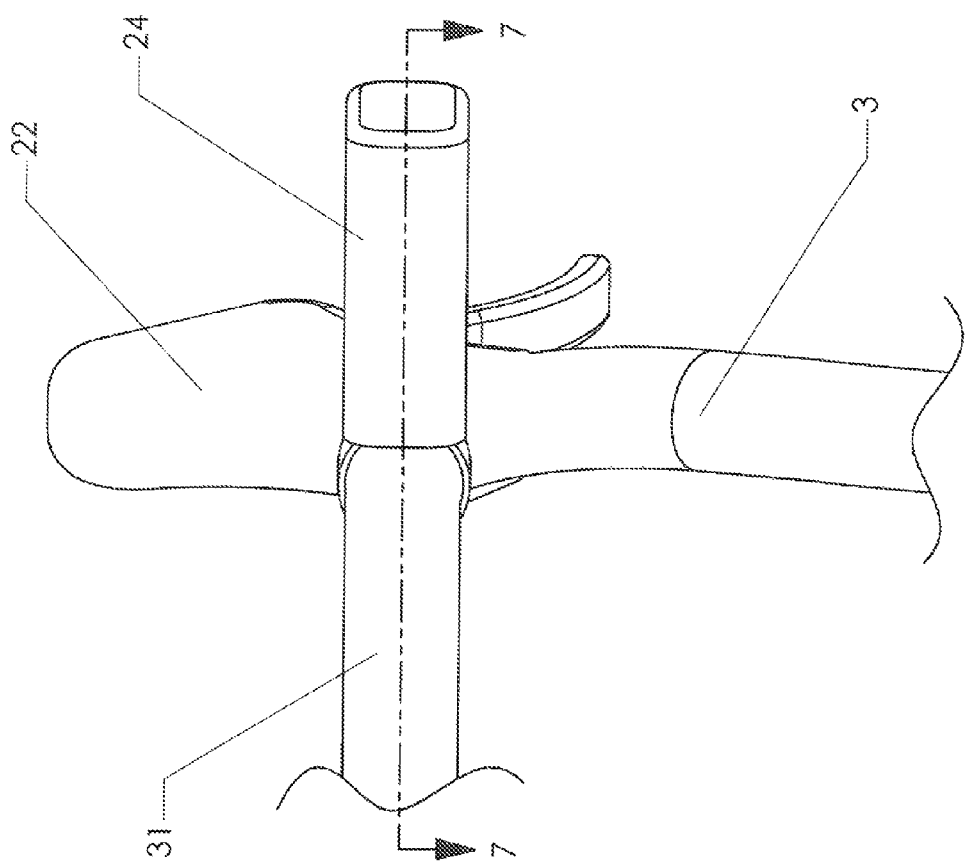
FIG. 6 is an elevation view looking from the rear of the handlebar assembly toward the front.
Figure 7:
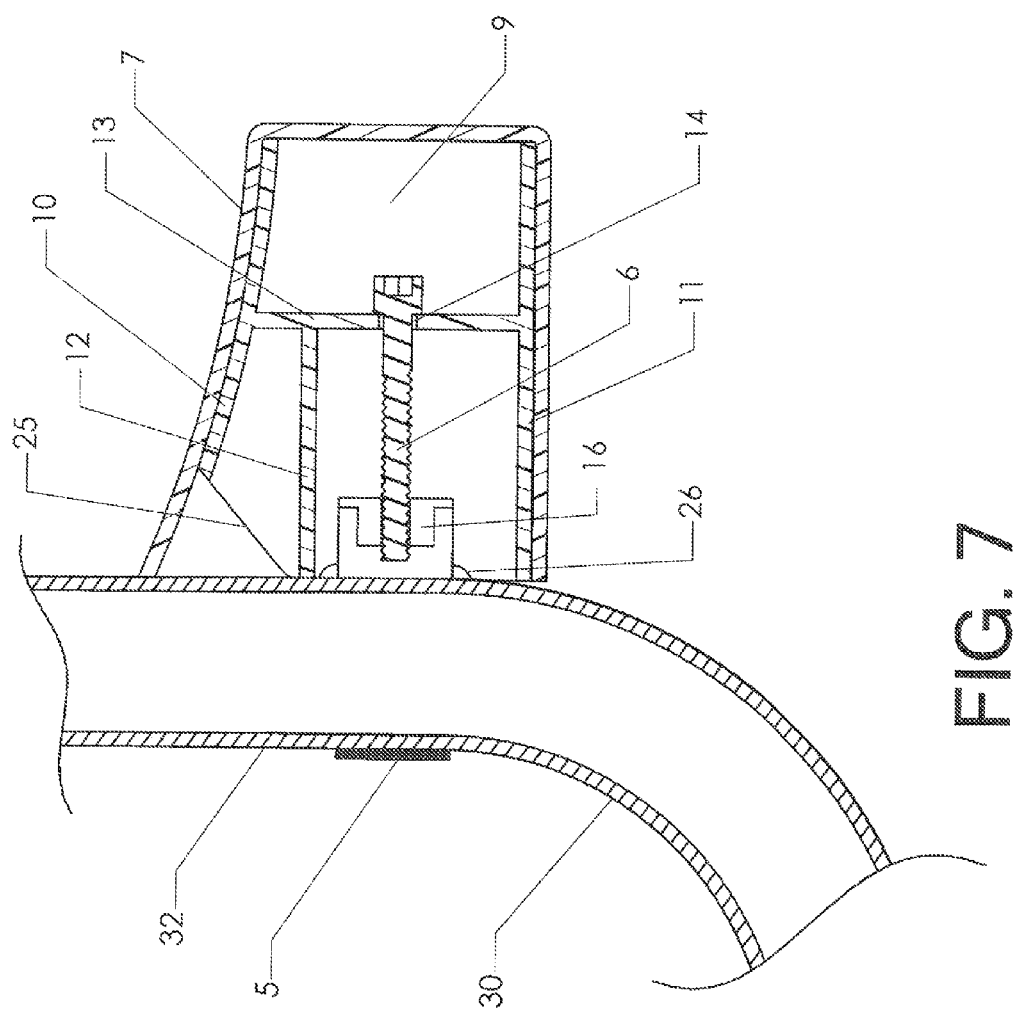
FIG. 7 is a section view along the 7-7 plane of FIG. 6, showing the palm support attached to a handlebar.

FIG. 6 shows an elevation view of the handle bar assembly looking forward and down in a direction which is parallel to an axis drawn through forward portion 32). FIG. 7 is a section view along the 7-7 plane of FIG. 6, showing the palm support attached to forward portion 32.

Figure 8:
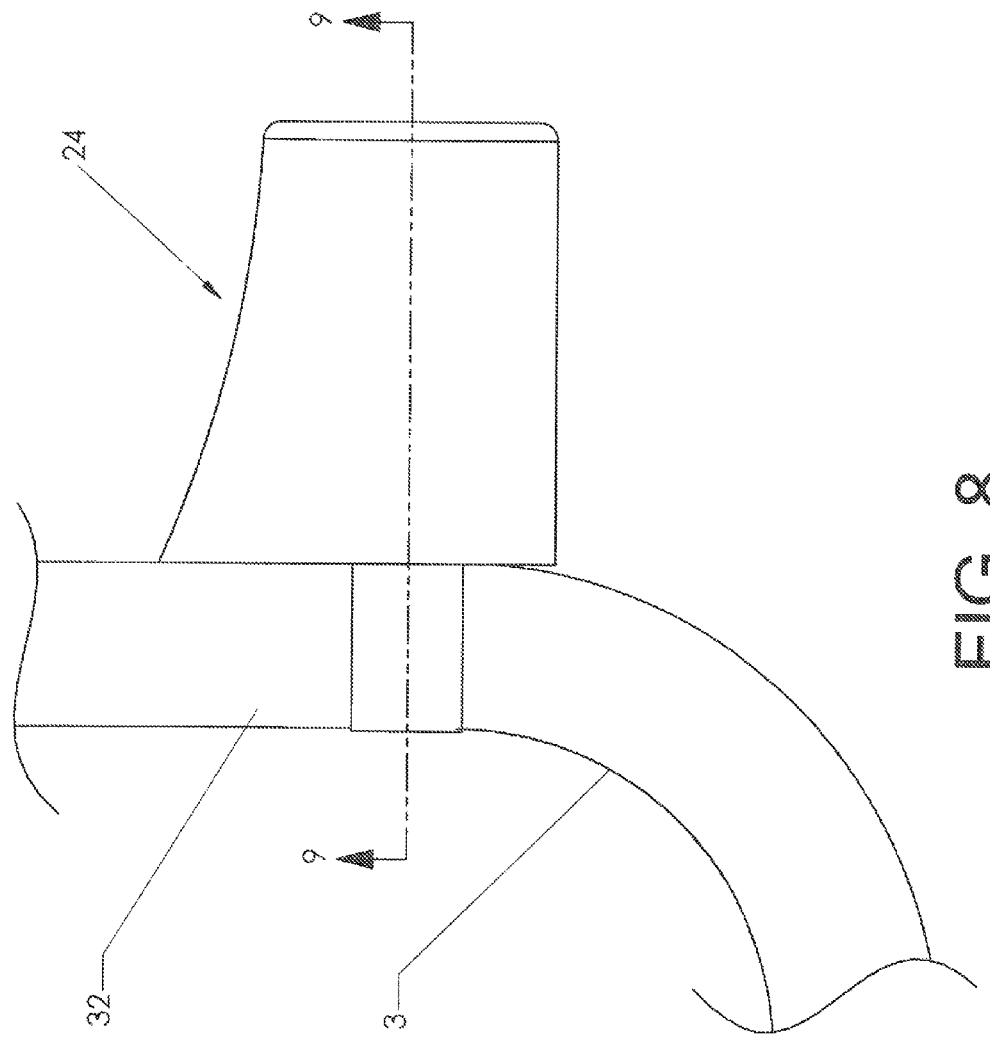
FIG. 8 is a plan view, showing a palm support attached to a handlebar.
Figure 9:
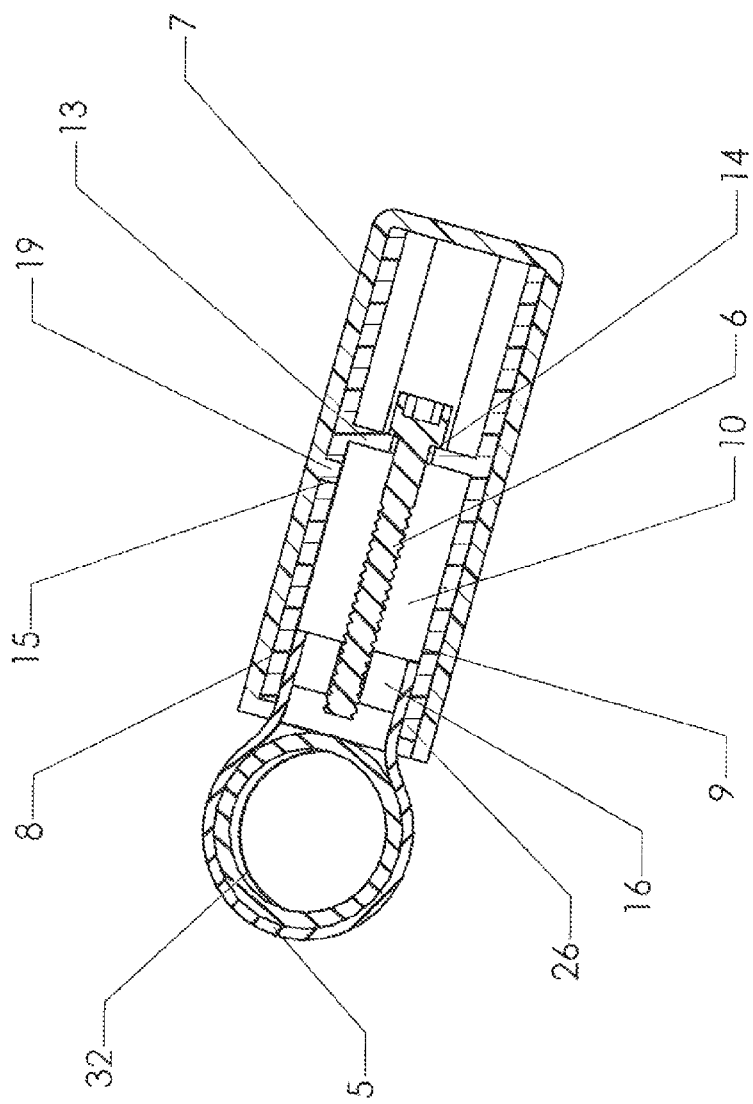
FIG. 9 is a section view along the 9-9 plane of FIG. 8, showing a palm support attached to a handlebar.

FIG. 8 is a plan view showing palm support 24 attached to forward portion 32. FIG. 9 is a section view along the 9-9 plane of FIG. 8, showing the palm support attached to the handlebar frame. As illustrated in FIGS. 7 and 9, bolt 6 secures the palm support to band 5. When bolt 6 is tightened, band 5 and the support member compress around forward portion 32. Referring to FIG. 9, the reader will note how protrusion 19 on cover 7 engages surface relief 15 (shown more clearly in FIG. 3) on top wall 8 of the support member. This keeps cover 7 from sliding off of the support member. Cover 7 is preferably made of a pliable material (such as rubber or polymer), which allows protrusion 19 to deform prior to reaching its "home" position in surface relief 15.

The reader will note that the clamping type of attachment mechanism allows the rider to vary the "pitch" of the palm support as desired (analogous to varying the angle of attack of an aircraft stabilator). For example, the rider may loosen bolt 6 and tilt forward wall 10 downward relative to rearward wall 11. Support member 4 may be rotated along the axis of bolt 6 until relief 26 contacts band 5. This allows the rider to develop a customized pitch that suits the rider's preferences (within a limited range of motion).

The rider may also vary the "roll" of the palm support. Still with respect to FIG. 9, the roll may be varied by loosening bolt 6 and rotating hand 5 about the tube of forward portion 32 until the desired angle with the horizontal is obtained. The user then tightens bolt 6 to lock the device in position.

The palm support is helpful when a rider is riding "on the hoods." In addition, the palm support actually facilitates a new riding position in which the entire palm is placed on the palm support.

Figure 10:
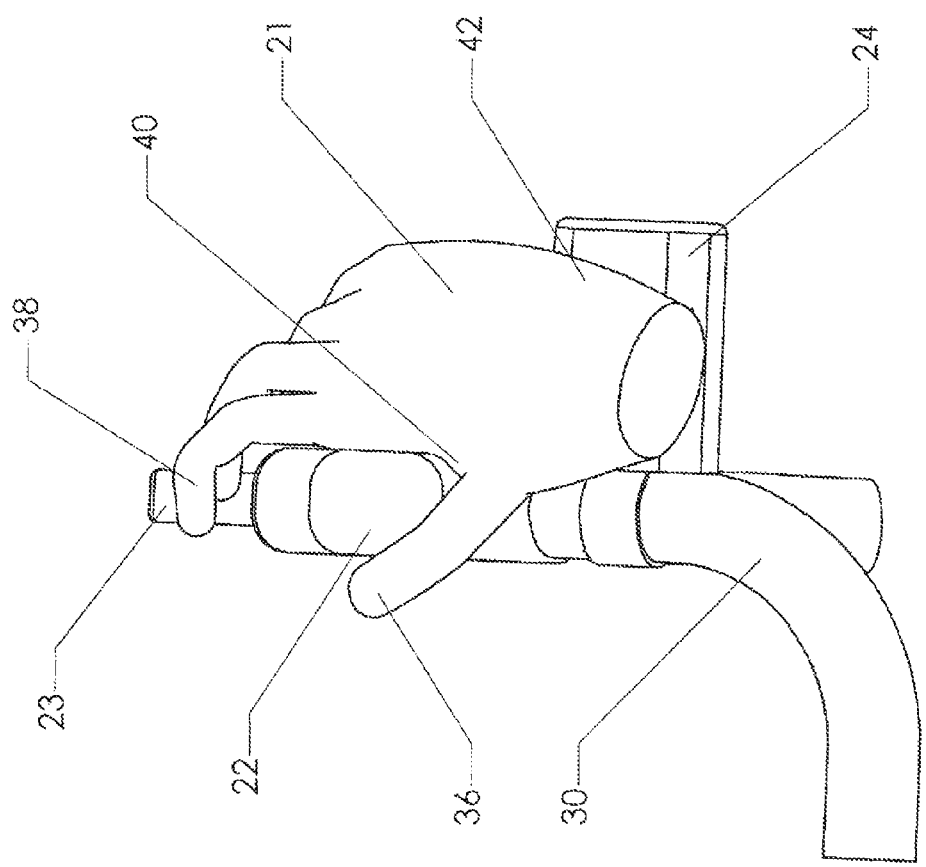
FIG. 10 is a plan view, illustrating how the palm support provides support to the distal lateral palm of a rider's hand when the hand is placed on a hood.
Figure 11:
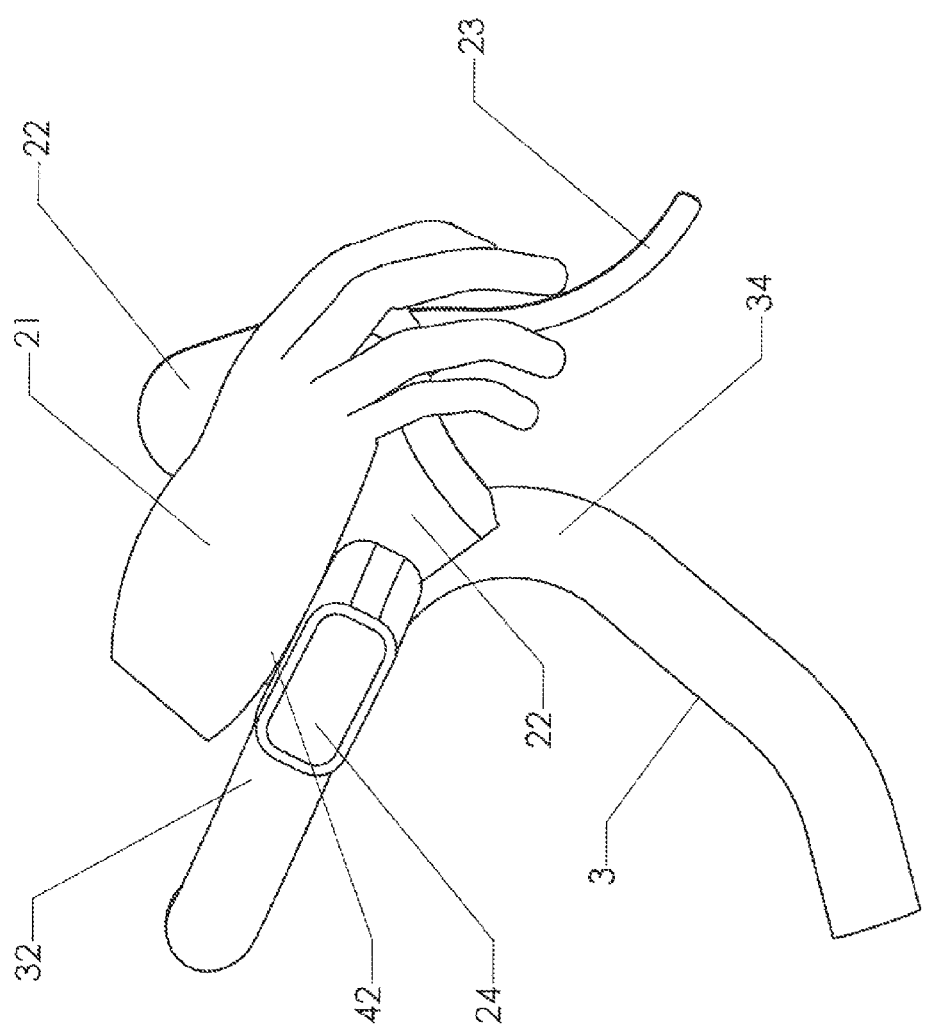
FIG. 11 is a side elevation view, illustrating how the palm support provides support to the distal lateral palm of a rider's hand when the hand is placed on a hood.
Figure 12:
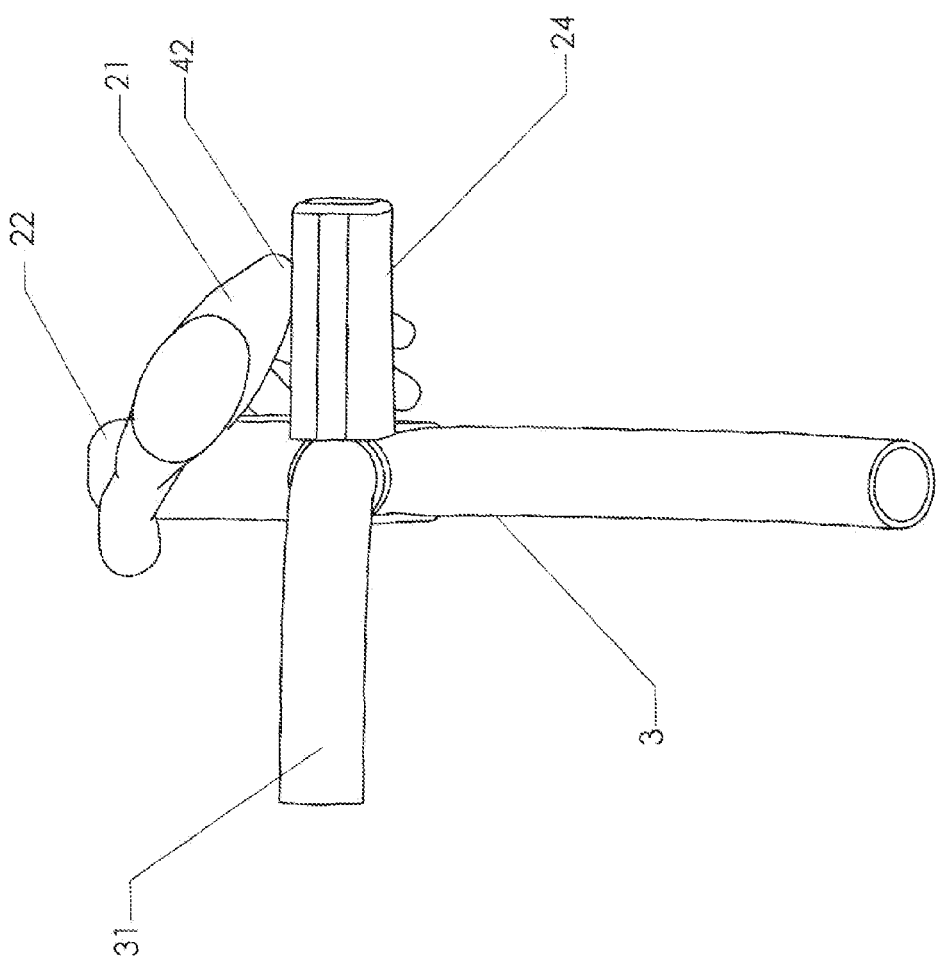
FIG. 12 is a view looking forward and down, illustrating how the palm support provides support to the distal lateral palm of a rider's hand when the hand is placed on a hood.

FIGs. 10, 11, and 12 show how palm support 24 supports the outside portion of the riders palm when riding on the hoods. FIG. 10 is a plan view looking straight down on the handlebar assembly. The rider places thumb 36 of hand 21 on the inside portion (the portion closest to the bike frame) of hood 22 as is normal when riding on the hood. First finger 38 is placed on the outside portion of hood 22. Web 40 (the portion of the hand lying between the thumb and first finger) rests on the rearward facing surfaces of hood 22 (and sometimes a portion may rest on the upward facing surfaces).

The hand position shown in FIG. 10 is typical for riding "on the hoods." Distal lateral palm 42 is typically unsupported in this configuration (which tends to cause the hand to roll outward and necessitates the rider tightly gripping the hood). Palm support 24 supports distal lateral palm 42 and prevents the unwanted rotation.

FIG. 11 shows an elevation view of the same configuration. The reader will observe how palm support 24 supports distal lateral palm 42. The reader may also readily observe the necessity of placing palm support 24 in close proximity to hood 22. The spacing between the hood and palm support is dictated by the geometry of the hand. The hand's web locates the hand (in terms of its fore and aft location). The position of palm support 24 is preferably made adjustable so that the user may configure it to suit variations in hand geometry and size.

FIG. 12 shows a view of the same configuration looking forward and downward (parallel to an axis drawn through forward portion 32). In this orientation the reader may more readily perceive how distal lateral palm 42 rests on palm support 24 and prevents the unwanted rotation of the hand.

Figure 13:
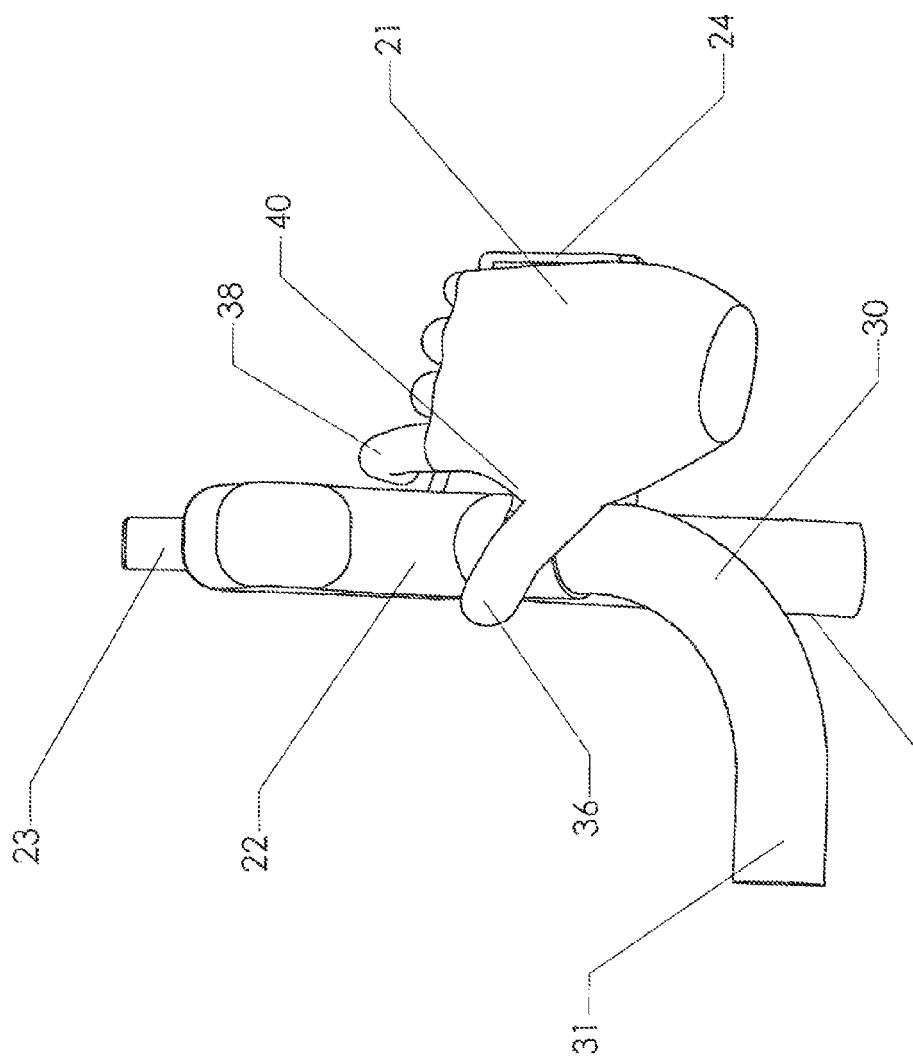
FIG. 13 is a plan view, illustrating how the palm support may be utilized for a new gripping position.
Figure 14:
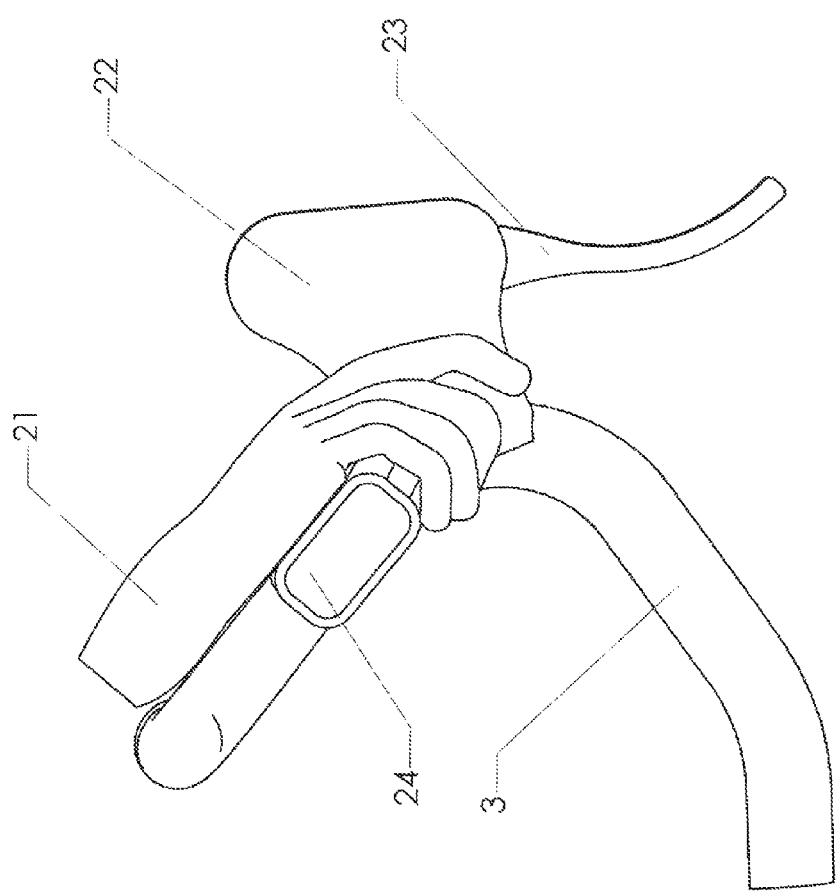
FIG. 14 is a side elevation view, illustrating how the palm support may be utilized for a new gripping position.
Figure 15:
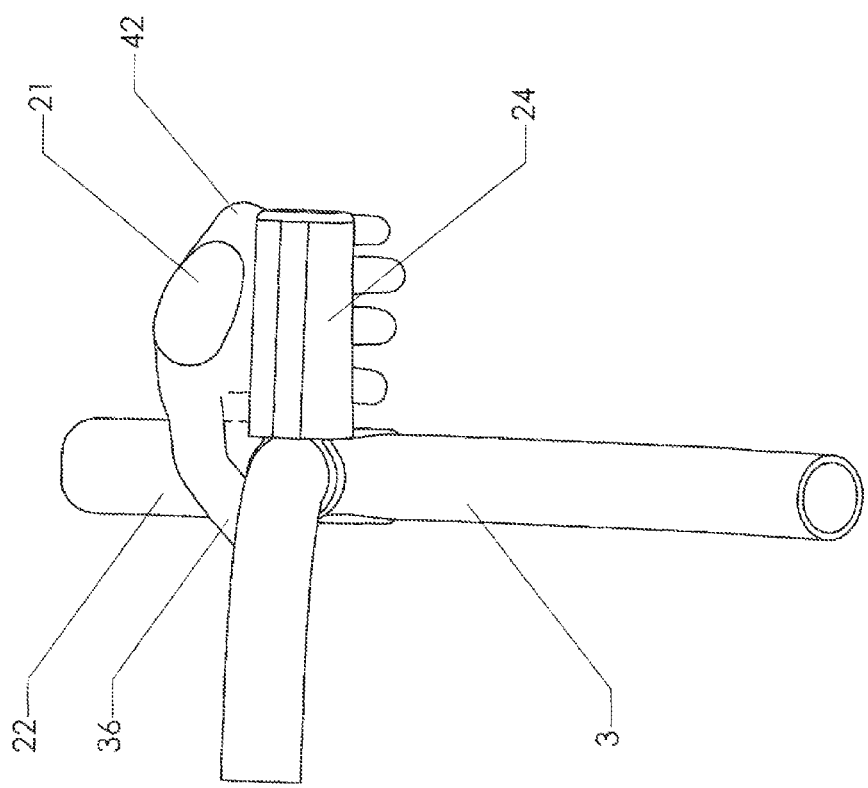
FIG. 15 is a view looking forward and down, illustrating how the palm support may be utilized for a new gripping position.

FIGS. 13-15 illustrate how the provision of the palm support on both sides of the handlebar assembly allows the user to employ a completely new riding position. FIG. 13 is a plan view looking straight down on the handlebar assembly. Thumb 36 is positioned approximately over band 5. All the fingers (including first finger 38) are wrapped around palm support 24. Web 40 is not resting against hood 22.

FIG. 14 shows a side elevation view of the same configuration. FIG. 15 shows a view looking forward and downward (parallel to an axis drawn through forward portion 32). The reader will perceive how hand 21 rests evenly atop palm support 24. By comparing FIGS. 10 and 13, the reader will perceive how a bicycle rider may easily transition between the configuration of FIG. 10 and, the configuration of FIG. 13 by shifting the hand onto and off of hood 22. The provision of palm support 24 in close proximity to the base of hood 22 permits this functionality. Although the rider cannot actuate brake/shift lever 23 from the position shown in FIG. 13, the rider only needs to shift hand 21 up hood 22 to bring brake/shift lever 23 into reach.

Palm support 24 preferably extends far enough away from forward portion 32 and hood 22 to support the distal lateral palm for a user having a wide palm. A suitable lateral extension is about 10 cm. Of course, the palm support can be made in a variety of sizes to suit different users. However, whatever dimensions are employed, it is important that the palm support be positioned so that the distal lateral palm is supported while the web of the hand is wrapped around the rearward facing surfaces of the hood.

In the embodiments illustrated, band 5 on the palm support corresponds to the location of the center of the palm support. The location of the band determines the palm support's fore and aft location along forward portion 32. Band 5 may be placed immediately to the rear of the rearward portion of brake/shift lever assembly 2 in some embodiments (suitable for a rider with a relatively small hand). In other embodiments, it may be desirable to place the center of the palm support as much as 6 cm to the rear of the brake/shift lever assembly.

The location of the palm support may also be defined in terms of forward wall 10 and rearward wall 11 (see FIG. 4). The outer portion of forward wall 10 is preferably about even with the rearmost portion of hood 22 and may even be 2 to 3 cm forward of this position. It may also be about 2 to 3 cm rearward of this position. The outer portion of rearward wall 11 is preferably 2 cm to 10 cm to the rear of the rearmost portion of hood 22.

In general palm support 24 should extend laterally away from the handlebar in a direction which is approximately perpendicular to hood 22 (see FIG. 15). The hood extends vertically upward. However—as noted with respect to FIG. 9—the angle between the palm support and the hood may be customized by the user. Thus, the term "approximately perpendicular" should be understood to encompass a range between about 60 degrees and about 120 degrees.

Figure 16:
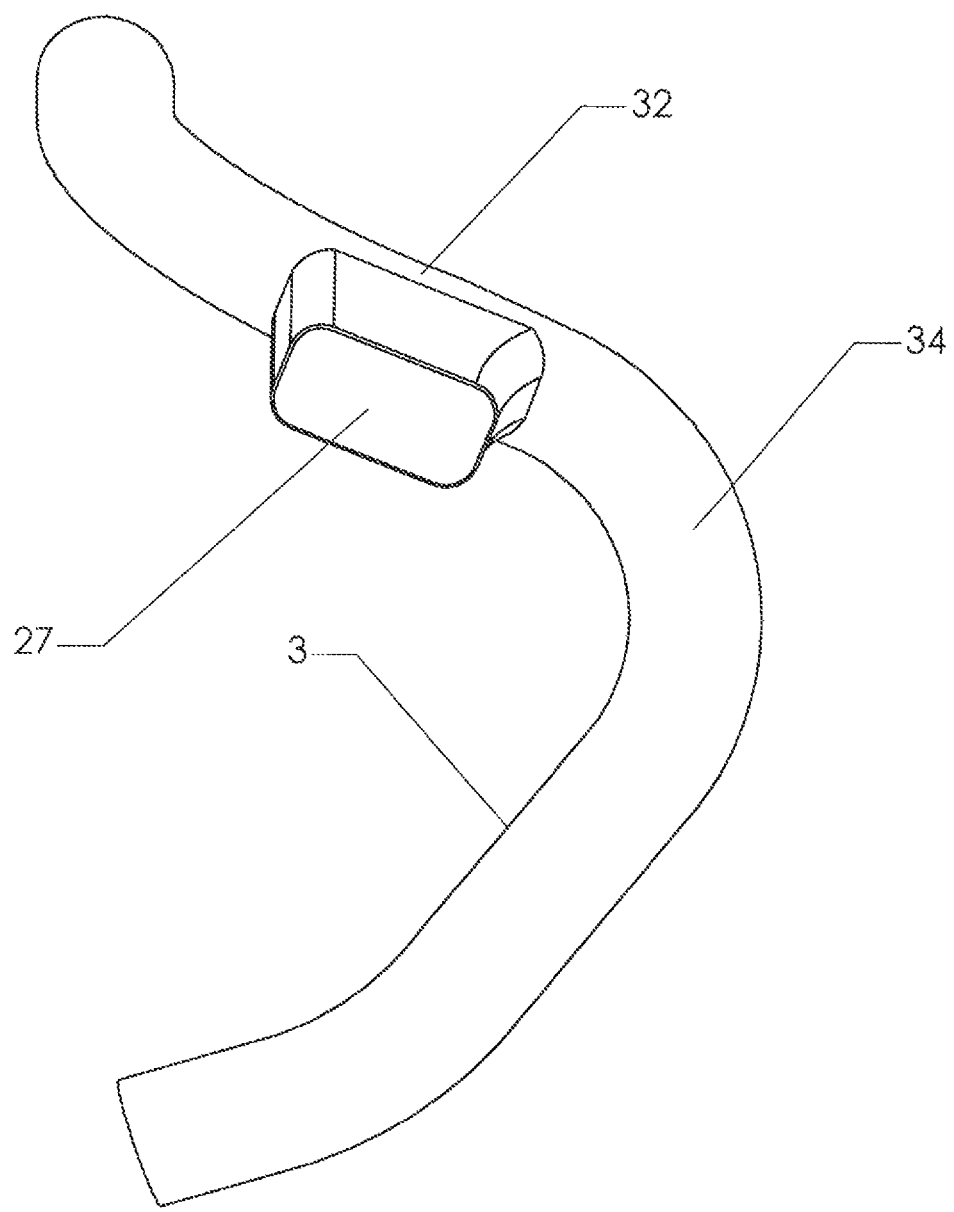
FIG. 16 is a perspective view, showing an alternate embodiment of the present invention.
Figure 17:
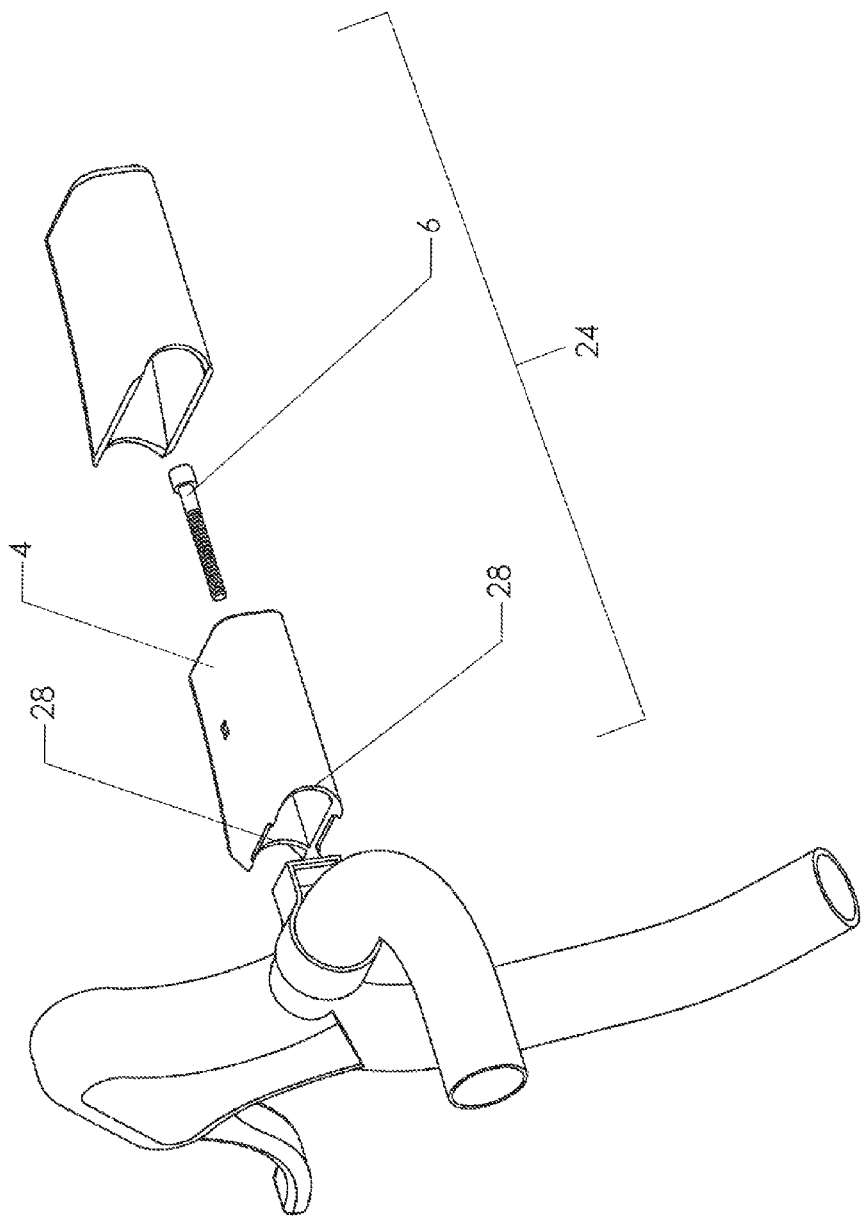
FIG. 17 is an exploded view, showing an alternate embodiment of the present invention.

The preceding description contains significant detail regarding the novel aspects of the present invention. It should not be construed, however, as limiting the scope of the invention but rather as providing illustrations of the preferred embodiments of the invention. For example, as illustrated in FIG. 16, palm support 27 may be made as an integral piece of forward portion 32 (it may be molded as part of the handlebar or welded to it). Also, as illustrated in FIG. 17, support member 4 may be "keyed" to it a specific section of the frame with frame reliefs 28 (which are cylindrical reliefs in this embodiment). This feature allows the pitch of the palm support to be preset so that no pitch adjustment of support member 4 relative to the axis of bolt 6 is possible. Such variations would not alter the function of the invention. Thus, the scope of the invention should be fixed by the following claims, rather than by the examples given.

Having described my invention, I claim:

1. A bicycle handlebar assembly, comprising:
    a middle portion;
    a forward portion connected to said middle portion by a horizontal bend;
    a vertical bend connected to said forward portion;
    a brake/shift lever assembly attached to said handlebar assembly proximate said vertical bend, said brake/shift lever assembly having a hood extending vertically upward, said hood having a rearward portion; and
    a palm support attached to said forward portion proximate said hood, said palm support extending laterally away from said forward portion in a direction that is opposite a direction of said middle portion, said direction of said forward portion also being approximately perpendicular to said vertically extending hood a forward wall in said palm support;

a rearward wall in said palm support; and wherein a vertical position of said forward wall is adjustable with respect to a vertical position of said rearward wall.

2. A bicycle handlebar assembly as recited in claim 1, wherein said palm support includes a rigid support member and a flexible cover extending over said support member.

3. A bicycle handlebar assembly as recited in claim 1, further comprising:

a band attached to said forward portion, said band including a bolt receiver;

a bore through said palm support; and a bolt passing through said bore in said palm support and into said bolt receiver in said band.

4. A bicycle handlebar assembly as recited in claim 2, further comprising:

a hand attached to said forward portion, said band including a bolt receiver;

a bore through said rigid support member; and a bolt passing through said bore in said rigid support member and into said bolt receiver in said band.

5. A bicycle handlebar assembly as recited in claim 3, wherein said band may be rotated with respect to said forward portion, thereby providing a roll adjustment between said palm support and said hood.

6. A bicycle handlebar assembly as recited in claim 4, wherein said band may be rotated with respect to said forward portion, thereby providing a roll adjustment between said palm support and said hood.

7. A bicycle handlebar assembly as recited in claim 1, wherein said hood has a rearward portion and said forward portion of said palm support lies in a range between 3 cm to the front of said rearward portion of said hood and 3 cm to the rear of said rearward portion of said hood.

8. A bicycle handlebar assembly as recited in claim 2, wherein said hood has a rearward portion and said forward portion of said palm support lies in a range between 3 cm to the front of said rearward portion of said hood and 3 cm to the rear of said rearward portion of said hood.

9. A bicycle handlebar assembly, comprising:

a middle portion;

a forward portion connected to said middle portion by a horizontal bend;

a vertical bend connected to said forward portion;

a brake/shift lever assembly attached to said vertical bend, said brake/shift lever assembly having a hood extending vertically upward, with said hood having a rearward portion; and a palm support attached to said forward portion proximate said hood, said palm support extending laterally away from said forward portion in a direction which is approximately perpendicular to said vertically extending hood and in a direction which is opposite a direction of said middle portion, said palm support having a forward portion which lies proximate said rearward portion of said hood a forward wall in said palm support;

a rearward wall in said palm support; and wherein a vertical position of said forward wall is adjustable with respect to a vertical position of said rearward wall.

10. A bicycle handlebar assembly as recited in claim 9, wherein said palm support includes a rigid support member and a flexible cover extending over said support member.

11. A bicycle handlebar assembly as recited in claim 9, further comprising:

a band attached to said forward portion, said band including a bolt receiver;

a bore through said palm support; and a bolt passing through said bore in said palm support and into said bolt receiver in said band.

12. A bicycle handlebar assembly as recited in claim 10, further comprising:

a band attached to said forward portion, said band including a bolt receiver;

a bore through said rigid support member; and a bolt passing through said bore in said rigid support member and into said bolt receiver in said band.

13. A bicycle handlebar assembly as recited in claim 11, wherein said band may be rotated with respect to said forward portion, thereby providing a roll adjustment between said palm support and said hood.

14. A bicycle handlebar assembly as recited in claim 12, wherein said band may be rotated with respect to said forward portion, thereby providing a roll adjustment between, said palm support and said hood.

15. A bicycle handlebar assembly as recited in claim 9, wherein said hood has a rearward portion and said forward portion of said palm support lies in a range between 3 cm to the front of said rearward portion of said hood and 3 cm to the rear of said rearward portion of said hood.

16. A bicycle handlebar assembly as recited in claim 10, wherein said hood has a rearward portion and said forward portion of said palm support lies in a range between 3 cm to the front of said rearward portion of said hood and 3 cm to the rear of said rearward portion of said hood.

* * * * *